May 28, 1929.  W. H. O'CONNOR  1,714,886
PORK SKINNING MACHINE
Filed Nov. 14, 1925  2 Sheets-Sheet 1

Inventor
W. H. O'CONNOR.
By Semmes & Semmes
Attorney

May 28, 1929.  W. H. O'CONNOR  1,714,886
PORK SKINNING MACHINE
Filed Nov. 14, 1925  2 Sheets-Sheet 2
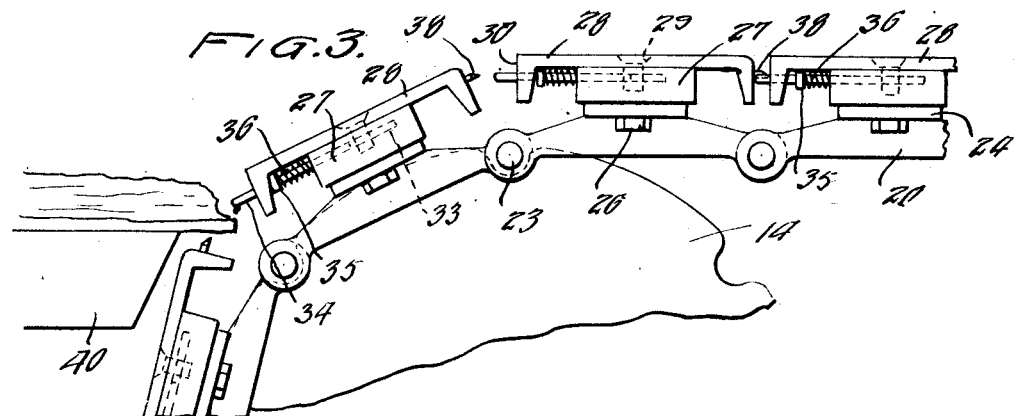
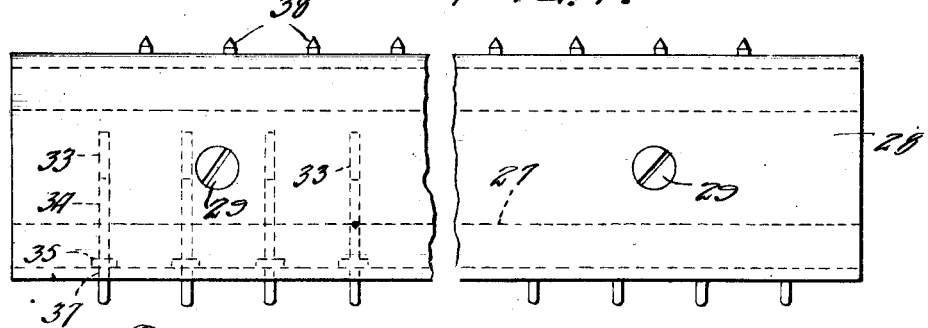
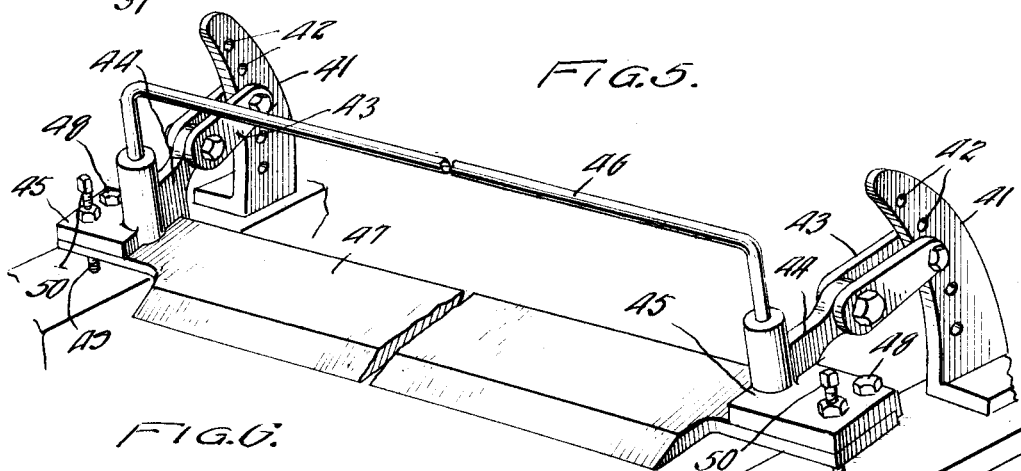
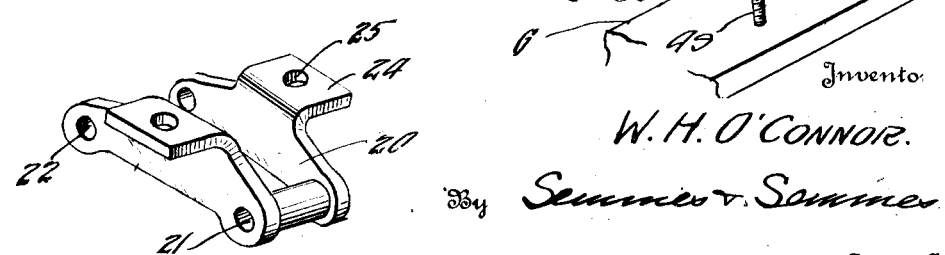
Inventor
W. H. O'CONNOR.
By Sommer & Sommer
Attorneys Patented May 28, 1929.

1,714,886

UNITED STATES PATENT OFFICE.

WILLIAM H. O'CONNOR, OF NEWARK, NEW JERSEY.

PORK-SKINNING MACHINE.

Application filed November 14, 1925. Serial No. 69,036.

This invention relates to skinning machines, and more particularly to pork skinning machines.

An object of the invention is to provide a machine for removing the skin from pork without injury to the skin.

Another object of the invention is to provide a machine having an endless traveling feed mechanism cooperating with a stationary knife or blade.

Another object of the invention is to provide a pork skinning machine having an endless traveling feed mechanism so constructed and arranged as to provide a table for the product to be operated upon, and to equip such feed mechanism with means for firmly supporting the product while under treatment against displacement or movement.

Yet another object of the invention is to provide a pork skinning machine with an endless traveling feed mechanism so constructed and arranged as to support the product under treatment in a fixed position on a flat surface, in order that the severing knife or blade may be adjusted to operate in close proximity to the feed mechanism.

A further object of my invention is to provide a machine with an endless traveling feed mechanism designed to support and to sustain against displacement the product to be operated upon, and to provide a firm operating base free from vibration designed to cooperate with a severing blade. The construction is such as to allow adjustment of the blade to a nicety without danger of coming in contact with the feed mechanism during the operation of the machine.

Yet a further object of this invention is to provide an endless traveling feed mechanism, comprising parallel belts upon which are transversely mounted bars in close relation, the bars being provided upon their adjacent faces with means for engaging the product to be operated upon.

A still further object of my invention is to provide a skinning machine which is highly efficient and positive in operation, yet of such marked simplicity as a whole and in respect to each of its component parts, that its manufacture can be economically facilitated both as regards to parts and their assembly.

With these and other objects in view, which may be incident to my improvements, the invention consists in the parts and combinations to be hereinafter set forth and claimed, with the understanding that the several necessary elements comprising my invention may be varied in construction, proportion and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Fig. 3 is a detail view in side elevation, illustrating the conveyor, the manner of mounting the transverse bars and the gripping pins;

Fig. 4 is a top plan view of one of the transverse bars;

Fig. 5 is an enlarged detail view in perspective of the severing blade and its mountings;

Fig. 6 is a detail view in perspective of one link of the conveyor chain; and

Figure 1:
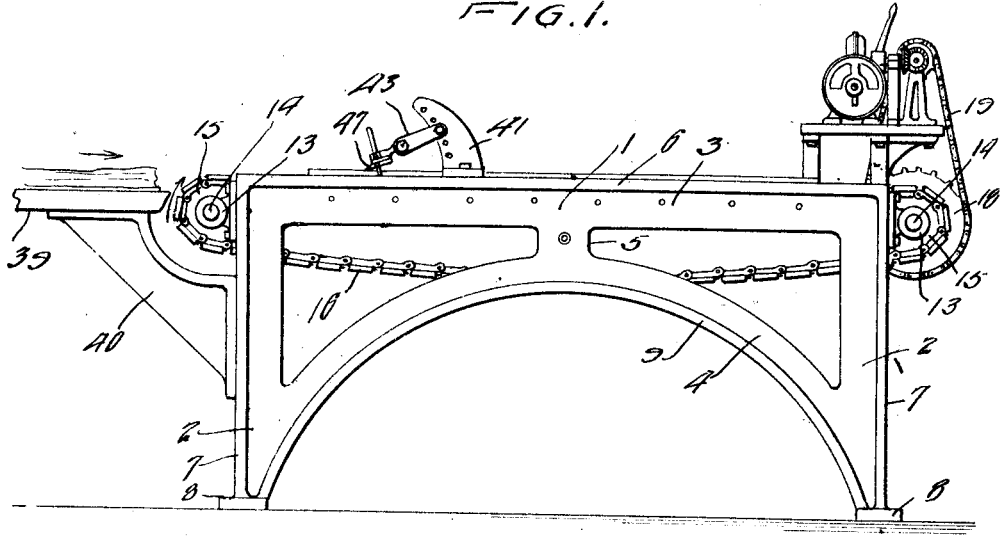
Figure 1 is a side elevation of the complete machine with a feed table attached.

Referring by numerals to the drawings, 1 represents a rectangular frame comprising corresponding side sections cast in one piece with vertical corner sections 2 connected at the top by a horizontal section 3. The corner sections 2 and the horizontal sections 3 are connected and braced by an arcuate plate 4 extending from the base of one corner section to the base of the other corner section, and connected centrally to the horizontal section 3 by a web 5.

The side sections are further strengthened and made rigid by a flange 6 on the horizontal section 3, formed integral therewith, and with flanges 7 on the corner sections 2. The corner sections 2 are provided with base or floor plates 8. The base plates 8 are formed integral with a flange 9 on the arcuate brace plate 4.

The side sections are connected by crossbars 10 mounted between the corner sections and bolted thereto, as shown at 11, also a central cross-bar 12 bolted through the web 5. It is, of course, to be understood that any form of cross bracing may be employed which will not interfere with the operative parts of the machine, and yet will impart strength and rigidity to the frame.

Mounted upon the respective ends of the frame, in suitable journals 13 bolted to the flanges 7 on the corner sections 2, are corresponding transverse parallel shafts 14. Keyed upon the shafts 14 near each corner of the frame is a sprocket 15. The sprockets 15 on one of the shafts 14 are in perfect alignment with the corresponding sprockets 15 on the other shaft. The sprockets 15 are connected by corresponding parallel link chains or belts 16, of a particular design, to be hereinafter described. The belts 16 travel through channeled guides 17 bolted to the cross-bars 10.

One of the shafts 14 is provided with a sprocket pulley 18 connected by a bolt 19 to a driving mechanism mounted upon the top of the frame. The driving mechanism may be otherwise placed and connected, or varied according to the fancy of the producer or manufacturer.

The chain belts 16 hereinabove referred to are each composed of a plurality of U-shaped links 20. The heads of the links are transversely bored, as shown at 21, and the free ends of their arms or legs are provided with registering apertures 22. The head of each link is fitted between the legs of the preceding link, with the bore in the head registering with the apertures in the legs. Bolts 23, or other fastening means, are passed through registering apertures and bore so as to produce a flexible endless belt.

The legs of the U-shaped links are provided with flanges 24 at right angles to the leg portion of the link and oppositely disposed with respect to each other. The flanges 24 are provided with apertures 25 for the reception of bolts 26, by means of which bars 27 are secured upon the belts. The bars 27 are mounted transversely upon the belts 16 in parallel relation to each other. Plates 28 are mounted upon the bars 27 by studs 29. The plates 28 are wider than the bars 27 and are provided with downwardly extending beveled flanges 30, the object of which will hereinafter appear.

Figure 2:
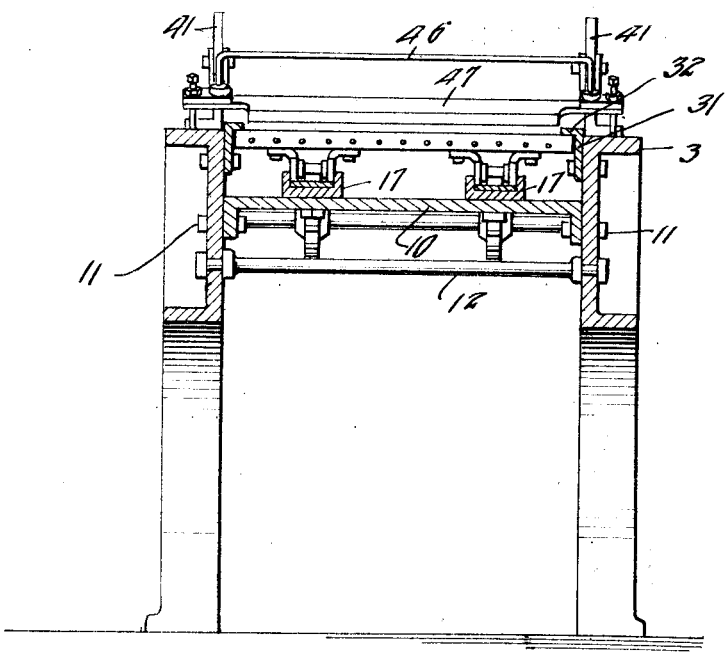
Fig. 2 is an end elevation with the shearing blade and its supporting brackets removed.

As the belts 16 pass through the guideways 17, the ends of the plates 28 abut guide plates 31 bolted to the sides of the frame. The guide plates 31 are provided with flanges 32, the bottom faces of which are on a line with the top of the frame. The flanges 32 project over the ends of the plates 28, as clearly shown in Figure 2. The top surface of the plates 28 are thus on a line with the top of the frame. It will be seen that by reason of the particular mounting of the bars 27, the plates 28 carried thereby, and the arrangement of the guideways 17 provided for the belts 16, all possibility of twisting or buckling, and all vibration, is reduced to a minimum, thus insuring a smooth operation of the machine.

The transverse bars 27, which are bolted to the links 20 of the belts 16, are each provided with a plurality of recesses 33. Mounted in the recesses 33 are plungers 34. The plungers 34 are each provided with a sleeve or collar 35. Mounted upon the plungers 34 are coiled springs 36 interposed between the sleeves or collars 35 and the bar 27. The free ends of the plungers 34 pass through apertures 37 in one of the beveled flanges 30 of the plate 28. The plungers 34 are retained in the recesses 33, and limited in their outward movement by the sleeves or collars 35 bearing against the inside of the beveled flange 30. The opposite beveled flange 30 on the plate 28 is provided with a plurality of pins 38 arranged in an alternating position with respect to the plungers 34. The bevel of the flanges 30 allows the material under treatment to more readily conform to the conveyor.

Figure 7:
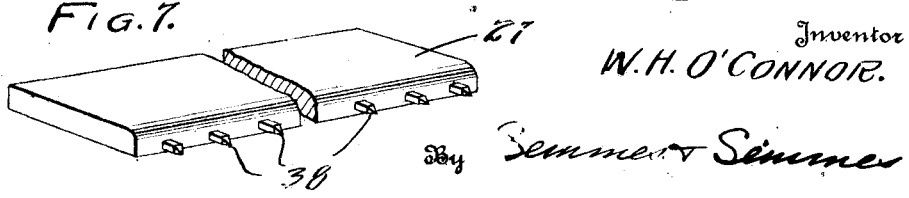
Fig. 7 is a plan view illustrating a modified form of one of the transverse bars.

In Figure 7 I have shown a modification of the transverse bar 27 wherein the bar is reduced to its utmost simplicity. In this modified form, the bar 27 consists of a rectangular strip provided with apertures for the reception of the bolts 26 by means of which the bars are mounted on the links 20 of the belts 16. The bar in this form is slightly curved or beveled upon one of its upper side edges, and the side having the curved edge is provided with a plurality of pins 38. The pins 38 are made removable for replacement and repairs. The pins 38 engage and embed themselves in the skin. This action is greatly assisted by the side of the adjacent bar with which the pins contact when the bars are in a horizontal position on the top of the conveyor. The rounded edge of the bar allows the material under treatment to more readily conform to the conveyor.

When the bars 27 are bolted to the belts 16 and the plates 28 secured in position with the plungers 34 in place, the adjacent flanges 30 upon the plates 28 are in spaced relation, with the free ends of the plungers 34 projecting through the flange on one plate and bearing against the flange on the adjacent plate. The position is maintained throughout except at each end of the frame where the belt passes over the sprockets. At these points, owing to the semi-circular path of travel, the plates move apart, as most clearly shown in Figure 3. Accordingly, at the forward end of the frame there is provided a feed table 39 supported by corresponding and oppositely disposed brackets 40 bolted to the flanges 7 of the corner sections 2.

Mounted upon the flanges 6 of the top sections 3 are corresponding and oppositely disposed arcuate brackets 41. The brackets 41 are provided with a plurality of apertures 42, the apertures in one bracket registering with the apertures in the other. Adjustably mounted in registering apertures 42 are links 43 which are pivotally connected to arms 44 integral with the plates 45. The plates 45 are connected by an upstanding cross-bar 46. The plates 45 are adapted to receive and support a blade 47 which is secured to the plates 45 by bolts 48. The set of the blade 47 is made adjustable by means of set screws 49 mounted in the plates 45 and provided with lock nuts 50.

In setting the blade 47 by means of the set screws 49, the blade is adjusted at an angle to the conveyor. When the blade comes in contact with a slab of pork upon the conveyor, the blade imparts a downward thrust which, together with the tension of the skin by which the slab of pork is held, causes the slab to straighten out and the skin and meat or fat to separate on their natural dividing line. The thickness of the skin varies, and in order to take care of this variation, the blade is mounted on the brackets 41 by links 43 which permit of a rise and fall of the blade according to the varying thickness of the skin. The fall or downward motion of the blade is limited by the set screws 49 which engage the top of the frame. Since the meat or fat is very thick in comparison with the skin, there is a tendency, as the blade is brought into operation, for the slab to rise over the blade. This tendency is overcome by the flexible mounting of the blade which causes an automatic adjustment thereof.

In operation, a slab of pork is placed upon the table 39 with the skin side down. The slab of pork is then shoved forward until its forward end projects over the edge of the table between the beveled flanges 30 of the adjacent plates 28. In this position, the forward end of the skin on the slab is caught by the pins 38. This is made possible by the arcuate travel of the conveyor at this point. By means of the pins 38, the slab is held sufficiently tight to be readily drawn on the conveyor. As the plates 28, between which the skin is caught, assume a position in line with the top of the conveyor, the spring actuated plungers 34 are brought into action, and securely clamp the skin upon the flange opposite the plungers, the plungers engaging the skin intermediate the pins. Where the solid bar is used, the pins 38, after engaging the material under treatment, are embedded in the same by the pressure exerted by the adjacent bar.

A slab of pork so fed to the conveyor is firmly held in position, and since the top of the conveyor passes between guides which prevent any vertical or side action, in short any vibration, it necessarily follows that the pork is brought in contact with the blade under the most favorable conditions. The set of the blade is adjusted according to the thickness of the skin, and as the conveyor travels beneath the blade, the skin is severed from the meat, the skin passing beneath the blade as the meat passes over the top of the blade. The flexible mounting of the blade allows the blade to rise and fall automatically, according to the varying thickness of the skin. The skin and meat are separated on the natural dividing line, and remain upon the conveyor until they reach the far end of the machine where the grip upon the skin is released and both the meat and skin drop from the machine into suitable receptacles.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various features of my invention, what I claim as new and desire to secure by Letters Patent is:

1. A skinning machine comprising a feeding means, a blade mounted transversely with respect to the feeding means, supporting members for the ends of the blade, a bar connecting the supporting members, and a linkage for mounting the supporting members.

2. A skinning machine comprising a conveyor, a bracket upon each side of the conveyor, a blade, a linkage connection between the brackets and the blade, and means for adjusting the set of the blade.

3. A skinning machine comprising a conveyor, an arcuate bracket mounted upon each side of the conveyor, the brackets being oppositely disposed with respect to each other, registering apertures in the brackets, corresponding plates connected by an upstanding U-shaped bar, a linkage connection between the plates and the apertured brackets, a blade mounted upon the plates, and means for adjusting the set of the blade.

4. A skinning machine comprising a conveyor, oppositely disposed brackets mounted upon the respective sides of the conveyor, registering apertures in the brackets, corresponding plates each having an upstanding boss, a U-shaped upstanding rod connecting the bosses, an arm carried by each boss, toggle connection between the arms and the apertured brackets, a blade detachably mounted upon the plates, and means for adjusting the set of the blade.

5. A skinning machine comprising a frame, a conveyor mounted upon the frame, guideways for supporting the conveyor in a horizontal position, and guideways for preventing vertical and side movement of the conveyor, and a transversely disposed floating blade.

6. A skinning machine comprising a frame, sprockets journaled at the respective ends of the frame, a conveyor mounted upon the sprockets, means for imparting motion to the conveyor, longitudinal guideways cooperating with the top and bottom of the conveyor to sustain the same against vibration, and a floating blade transversely disposed with respect to the top of the conveyor.

7. A skinning machine comprising a frame, sprockets mounted upon the respective ends of the frame, a conveyor mounted upon the sprockets, channeled guides through which the conveyor travels, means engaging the edges of the conveyor for supporting the same against vertical and side motion, and a floating blade transversely disposed with respect to the conveyor.

8. A skinning machine comprising a conveyor having a plurality of transverse bars, and a plurality of pins in each bar normally contacting with the adjacent bar.

9. A skinning machine comprising a conveyor having a plurality of parallel bars in spaced relation to each other, an upper side edge of each bar being curved, a plurality of pins mounted upon one side of each bar, the pins being mounted in the side having the curved edge, and the pins in one bar normally contacting with the adjacent bar.

10. A skinning machine comprising a conveyor having a plurality of parallel bars in spaced relation to each other, a plurality of pins upon one side of the bar, and a plurality of plungers upon the other side of the bar.

11. A skinning machine comprising a conveyor having a plurality of parallel bars, a plurality of pins mounted upon one side of each bar, a plurality of spring actuated plungers mounted in the other side of each bar, the pins mounted in one bar contacting with the adjacent bar, and the plungers mounted in one bar contacting with the adjacent bar.

12. A skinning machine comprising a conveyor having a plurality of parallel bars, plates mounted upon the bars, and spring actuated plungers mounted in the bars and plates.

13. A skinning machine comprising a conveyor having a plurality of parallel bars, plates mounted upon the bars, downwardly projecting flanges upon the plates, recesses in the bars, apertures in one of the downwardly projecting flanges on each plate registering with the recesses in the bars upon which it is mounted, spring actuated plungers mounted in the registering apertures and recesses, and pins upon the other flange of each plate.

14. A skinning machine comprising corresponding link belts, parallel bars mounted upon the links, a plurality of recesses in each bar, plates mounted upon the bars, downwardly projecting flanges on the side edges of the plates, apertures in one of the flanges of each plate registering with the recess in the bar upon which the plate is mounted, plungers mounted in the registering apertures and recesses, spring mounted upon the plungers between the bars and the flanges, and pins upon the oppositely disposed flange of each plate.

15. A skinning machine comprising corresponding link belts, parallel bars mounted upon each of the links, a plurality of recesses in each of the bars, a plate mounted upon each bar, the plate having downwardly projecting beveled flanges, apertures in one of the beveled flanges, the apertures registering with the recesses in the bar, the other flange having a plurality of pins, plungers mounted in the registering apertures and recesses, a collar upon each plunger, and a spiral spring mounted upon each plunger between the collar and the bar.

16. A skinning machine comprising a conveyor having belts formed of a plurality of corresponding links, parallel bars mounted upon the links, a plurality of recesses in the bars, plates mounted upon the top of the bars, downwardly projecting beveled flanges upon the side of the plates, the flanges on one side of the plates having a plurality of apertures registering with the recesses in the bars, the flange upon the opposite side of the plate having a plurality of pins, plungers mounted in the registering apertures and recesses, collars, upon the plungers, and springs mounted upon the plungers intermediate the collars and the bars.

17. A skinning machine comprising a conveyor having a plurality of parallel bars in spaced relation with respect to each other, a plurality of pins mounted upon one side of each bar, a plurality of spring actuated plungers mounted in the other side of each bar, the pins on one bar alternating with the plungers on the adjacent bar.

18. A skinning machine comprising a feeding means, a blade mounted transversely with respect to the feeding means and means to floatably mount the blade over the feeding means.

19. A skinning machine comprising a feeding means, a blade transversely disposed with respect to the feeding means, means to floatably mount the blade over the feeding means and adjustable stops to limit the movement of the blade in the direction of the skin.

In testimony whereof I affix my signature.

WILLIAM H. O'CONNOR.